(12) United States Patent
Faruque et al.

(10) Patent No.: US 12,012,075 B1
(45) Date of Patent: Jun. 18, 2024

(54) VEHICLE INCLUDING A MOVABLE CONSOLE AND A MOVABLE TABLE

(71) Applicant: Ford Global Technologies, LLC, Dearborn, MI (US)

(72) Inventors: Mohammad Omar Faruque, Ann Arbor, MI (US); Dean M. Jaradi, Macomb, MI (US); S. M. Iskander Farooq, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/187,822

(22) Filed: Mar. 22, 2023

(51) Int. Cl.
| | |
|---|---|
| *B60R 7/06* | (2006.01) |
| *A61G 3/08* | (2006.01) |
| *B60N 2/01* | (2006.01) |
| *B60N 3/00* | (2006.01) |
| *B60R 21/20* | (2011.01) |
| *B60R 21/26* | (2011.01) |
| *B62D 25/14* | (2006.01) |
| *B60R 21/217* | (2011.01) |

(52) U.S. Cl.
CPC ............ *B60R 7/06* (2013.01); *A61G 3/0808* (2013.01); *B60N 2/01* (2013.01); *B60N 3/001* (2013.01); *B60R 21/20* (2013.01); *B60R 21/26* (2013.01); *B62D 25/14* (2013.01); *B60R 2021/2173* (2013.01)

(58) Field of Classification Search
CPC ............................................. B60R 2021/2173
See application file for complete search history.

(56) References Cited

U.S. PATENT DOCUMENTS

| | | | |
|---|---|---|---|
| 5,390,952 A * | 2/1995 | Goor | B60R 21/01 |
| | | | 297/216.11 |
| 6,921,118 B2 | 7/2005 | Clark et al. | |
| 10,059,296 B2 | 8/2018 | Farooq et al. | |
| 10,232,815 B1* | 3/2019 | Dry | B60R 21/18 |
| 10,279,770 B2 | 5/2019 | Faruque et al. | |
| 10,285,880 B1 | 5/2019 | Ghannam et al. | |
| 10,766,447 B2 | 9/2020 | Jung | |
| 11,091,110 B2* | 8/2021 | Takemura | B60N 3/001 |
| 11,273,785 B1* | 3/2022 | Faruque | B60R 21/01554 |
| 11,364,872 B1 | 6/2022 | Jaradi et al. | |
| 11,554,739 B1* | 1/2023 | Jaradi | B60R 21/01512 |
| 11,577,680 B1* | 2/2023 | Faruque | B60N 3/002 |
| 11,884,229 B1* | 1/2024 | Faruque | B60N 2/753 |
| 2008/0129024 A1* | 6/2008 | Suzuki | B60R 21/23138 |
| | | | 280/743.1 |

(Continued)

FOREIGN PATENT DOCUMENTS

| | | | | |
|---|---|---|---|---|
| CN | 115431920 A * | 12/2022 | ....... | B60R 21/01538 |
| DE | 10361227 A1 | 7/2005 | | |

(Continued)

*Primary Examiner* — Nicole T Verley
(74) *Attorney, Agent, or Firm* — Frank A. MacKenzie; Bejin Bieneman PLC

(57) ABSTRACT

A vehicle includes a dash and an occupant-seating area. A console is moveable relative to the dash between a stowed position and a deployed position. The console is disposed in the dash in the stowed position. The console is movable away from the dash along the seat from the stowed position to the deployed position. A table is supported by the console. The table extends over the occupant-seating area when the console is in the deployed position.

19 Claims, 8 Drawing Sheets

(56) References Cited

U.S. PATENT DOCUMENTS

| | | | |
|---|---|---|---|
| 2008/0303302 A1* | 12/2008 | Sturt | B60R 7/04 |
| | | | 296/24.34 |
| 2020/0317155 A1* | 10/2020 | Deng | B60R 21/23138 |
| 2022/0096289 A1 | 3/2022 | Jaradi et al. | |
| 2022/0203923 A1* | 6/2022 | Jaradi | B60R 21/214 |
| 2022/0242353 A1* | 8/2022 | Binder | B60N 3/001 |

FOREIGN PATENT DOCUMENTS

| | | | | |
|---|---|---|---|---|
| DE | 202018104292 U1 * | 10/2018 | | B60N 2/01 |
| DE | 202018104293 U1 * | 10/2018 | | B60N 2/206 |
| DE | 102019122761 A1 * | 2/2020 | | B60K 37/00 |
| DE | 102019215499 A1 * | 12/2020 | | B60N 2/002 |
| DE | 102022113775 A1 * | 12/2022 | | B60R 21/01538 |
| DE | 102022114736 A1 * | 12/2022 | | B60R 21/215 |
| DE | 102022115610 A1 * | 12/2022 | | B60R 21/20 |
| DE | 102022122212 A1 * | 3/2023 | | B60R 21/0136 |
| DE | 102021213254 A1 * | 5/2023 | | B60N 3/002 |
| DE | 102023103741 A1 * | 8/2023 | | B60N 2/01516 |
| DE | 202023103941 U1 * | 8/2023 | | |
| DE | 102022110097 A1 * | 10/2023 | | |
| DE | 102023113111 A1 * | 11/2023 | | B60N 2/919 |
| WO | WO-2008109691 A2 * | 9/2008 | | G06F 1/1616 |
| WO | WO-2012131384 A2 * | 10/2012 | | B60N 3/001 |
| WO | WO-2019126685 A1 * | 6/2019 | | B60N 3/002 |

\* cited by examiner

VEHICLE INCLUDING A MOVABLE CONSOLE AND A MOVABLE TABLE

BACKGROUND

A vehicle may include a console assembly adjacent an occupant-seating area. As an example, the console assembly may be a middle console assembly between two occupant-seating areas. In some examples, one or more occupant-seating areas may be defined by a vehicle seat and/or one or more occupant-seating areas may be defined by components of the vehicle that receive a personal mobility device, e.g., a wheelchair, supporting an occupant in the vehicle.

The console assembly includes a console, e.g., a middle console, supported by a floor of the vehicle. Specifically, the middle console may extend upwardly from the floor between two occupant-seating areas. In such an example, the middle console abuts the floor. The middle console may include cup holders and may support vehicle controls, e.g., a gear shifter, window controls, HVAC controls, multimedia controls, etc.

DETAILED DESCRIPTION

Figure 1:
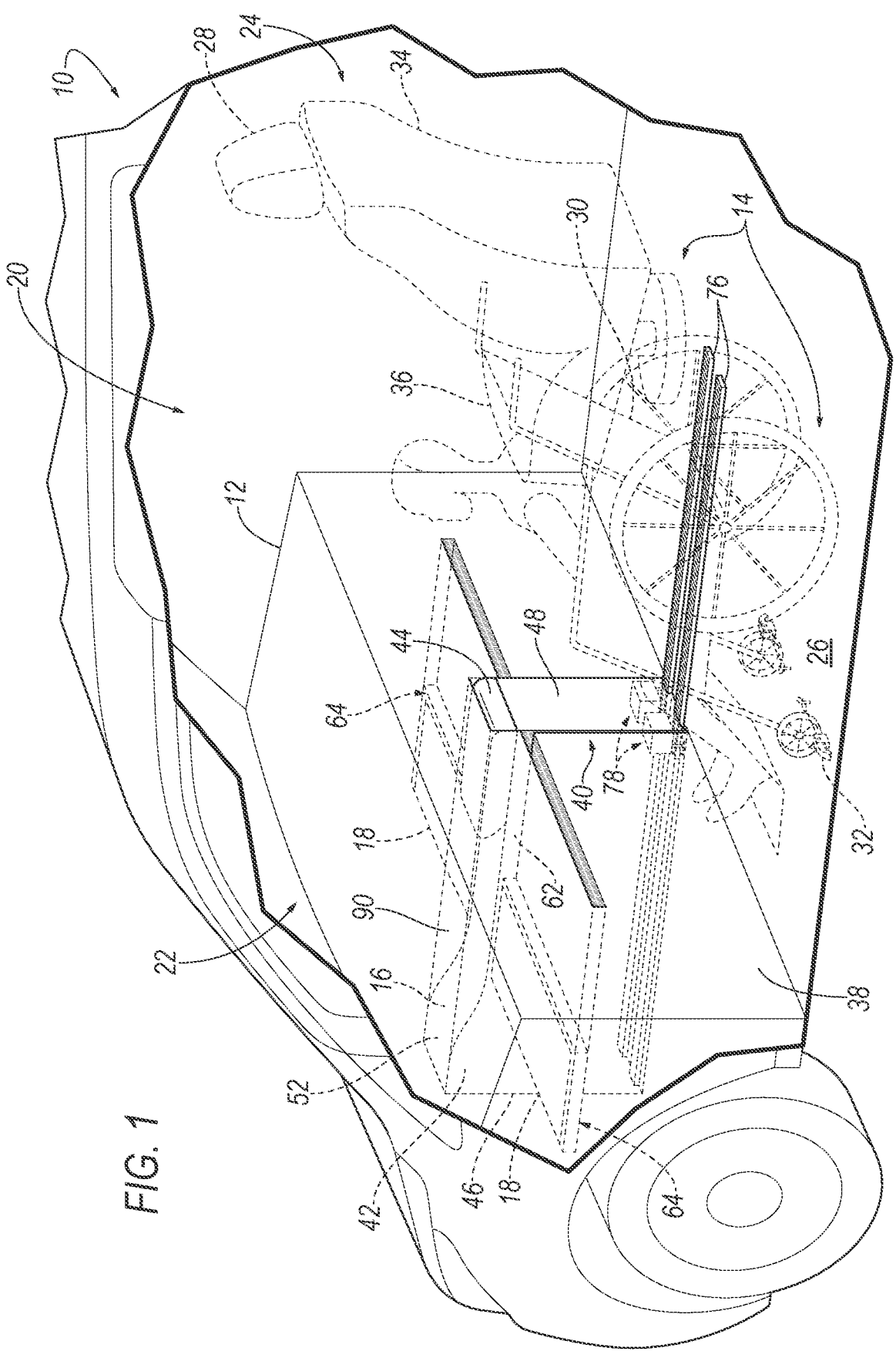
FIG. 1 is a perspective view of a vehicle having a console assembly including a console moveable along a vehicle floor and positioned in a stowed position.

A vehicle includes a dash and an occupant-seating area. A console is moveable relative to the dash between a stowed position and a deployed position. The console is disposed in the dash in the stowed position. The console is movable away from the dash along the occupant-seating area from the stowed position to the deployed position. A table is supported by the console. The table extends over the occupant-seating area when the console is in the deployed position.

An airbag may be supported by the table. The table may include a top and a peripheral edge around the top. The airbag may be mounted to the table at the peripheral edge and inflatable from the peripheral edge to an inflated position. An inflator may be supported by the console and fluidly connected to the airbag. A cover may be supported by the table. The airbag may be disposed between the table and the cover.

The table may be moveable with the console. The console may be moveable relative to the dash along a vehicle-longitudinal axis between the stowed position and the deployed position and the table may be moveable relative to the console along the vehicle-longitudinal axis.

The console may be moveable relative to the dash along a vehicle-longitudinal axis between the stowed position and the deployed position.

The occupant-seating area may be configured to receive a personal mobility device.

A vehicle seat may have the occupant-seating area.

The console may include a vehicle-forward end engaged with the dash in the deployed position.

The vehicle may include a vehicle floor. A track may be between the console and the vehicle floor. The console may be moveable along the track from the stowed position to the deployed position.

The dash may include a tunnel that receives the console in the stowed position. The console may include a vehicle-forward end engaged with the tunnel of the dash in the deployed position. The console may include a vehicle-rearward end. The vehicle-rearward end flush with the dash at the tunnel in the stowed position and spaced from is the dash in the deployed position.

The console includes a vehicle-rearward end. The vehicle-rearward end is flush with the dash in the stowed position and spaced from the dash in the deployed position.

The vehicle may include a vehicle floor. A track may be between the console and the vehicle floor. The console may be moveable along the track from the stowed position to the deployed position. The vehicle-rearward end may be engaged with the track in the deployed position.

The vehicle may include a second occupant-seating area. The console may be between the occupant-seating area and the second occupant-seating area in the stowed position. A second table may be supported by the console The second table may extend over the second occupant-seating area when the console is in the deployed position. A second airbag may be supported by the second table.

With reference to the Figures, wherein like numerals indicate like parts throughout the several views, a vehicle 10 includes a dash 12 and an occupant-seating area 14. A console 16 is moveable relative to the dash 12 between a stowed position and a deployed position. The console 16 is disposed in the dash 12 in the stowed position. The console 16 is movable away from the dash 12 along the occupant-seating area 14 from the stowed position to the deployed position. A table 18 is supported by the console 16. The table 18 extends over the occupant-seating area 14 when the console 16 is in the deployed position.

The console 16 may be selectively moveable between the stowed position and the deployed position. Since the table 18 extends over the occupant-seating area 14 when the console 16 is in the deployed position, the table 18 may be used by an occupant in the occupant-seating area 14. For example, the table 18 may be used as a work surface, temporary storage surface (e.g., for food, drink, reading material, mobile phone, etc.).

Figure 2:
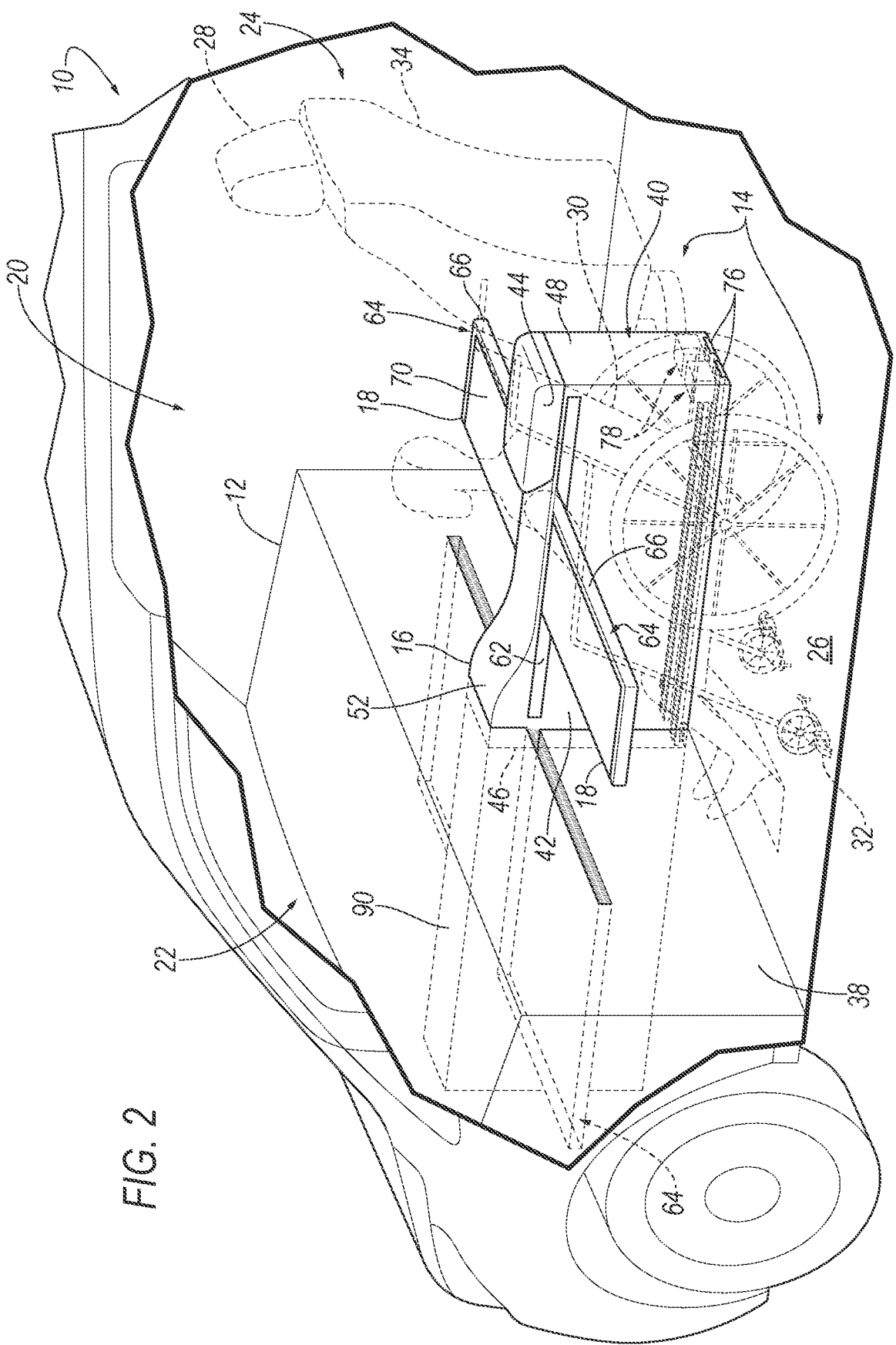
FIG. 2 is a perspective view of the vehicle with the console assembly in a deployed position.

With reference to FIGS. 1 and 2, the vehicle 10 may be any suitable type of automobile, e.g., a passenger or commercial automobile such as a sedan, a coupe, a truck, a sport utility vehicle, a crossover vehicle, a van, a minivan, a taxi, a bus, etc. The vehicle 10, for example, may be an autonomous vehicle. In other words, the vehicle 10 may be autonomously operated such that the vehicle 10 may be driven without constant attention from a driver, i.e., the vehicle 10 may be self-driving without human input.

With reference to FIG. 1, the vehicle 10 defines a vehicle-longitudinal axis L extending between a front-end (not numbered) and a rear-end (not numbered) of the vehicle 10. The vehicle 10 defines a vehicle-lateral axis extending cross-vehicle from one side to the other side of the vehicle 10. The vehicle 10 defines a vertical axis extending through a vehicle floor 26 and ceiling of the vehicle 10. The vehicle-longitudinal axis, the vehicle-lateral axis, and the vertical axis are perpendicular relative to each other.

The vehicle 10 includes a vehicle body (not numbered). The vehicle body may be of a unibody construction. In the unibody construction, the body, e.g., rockers, serves as a vehicle frame, and the vehicle body (including the rockers, pillars, roof rails, etc.) is unitary, i.e., a continuous one-piece unit. As another example, the vehicle body and frame may have a body-on-frame construction (also referred to as a cab-on-frame construction). In other words, the vehicle body and frame are separate components, i.e., are modular, and the vehicle body is supported on and affixed to the frame. Alternatively, the vehicle body may have any suitable construction. The vehicle body may be formed of any suitable material, for example, steel, aluminum, etc.

The vehicle 10 defines a passenger compartment 20 to house occupants, if any, of the vehicle 10. The passenger compartment 20 may extend across the vehicle 10, i.e., from one side to the other side of the vehicle 10. The passenger compartment 20 includes a front end 22 and a rear end 24 with the front end 22 being in front of the rear end 24 during forward movement of the vehicle 10.

The vehicle 10 includes the vehicle floor 26. The vehicle floor 26 may define the lower boundary of the passenger compartment 20 and may extend from the front end 22 of the passenger compartment 20 to the rear end 24 of the passenger compartment 20. The vehicle floor 26 may include upholstery, for example, carpet, and may have a class-A surface facing the passenger compartment 20, i.e., a surface specifically manufactured to have a high quality, finished, aesthetic appearance free of blemishes.

As set forth above, the vehicle 10 includes at least one occupant-seating area 14. The occupant-seating area 14 is the space occupied by an occupant properly seated in the vehicle 10. In some examples, one or more occupant-seating areas 14 may be defined by a vehicle seat 28 and/or one or more occupant-seating areas 14 may be defined by components of the vehicle 10 that receive a personal mobility device 30, e.g., a wheelchair, supporting an occupant in the vehicle 10.

In the example shown in the Figures, the vehicle 10 includes two occupant-seating areas 14 and the console 16 is between the occupant-seating areas 14 in the deployed position. In the example shown in the Figures, one of the occupant-seating areas 14 is configured to receive a personal mobility device 30 and the vehicle seat 28 defines the other occupant-seating area 14.

In the example in which the occupant-seating area 14 is configured to receive a personal mobility device 30, the passenger compartment 20 defines the occupant-seating area 14, which may also be referred to as a wheelchair-seating area. In such an example, the occupant-seating area 14 is the area occupied by an occupant properly seated in a wheelchair in the passenger compartment 20. In such an example, the floor 26 defines the occupant-seating area 14. The occupant-seating area 14 designates positions in the passenger compartment 20 for the occupant to occupy. For example, the occupant-seating area 14 may be defined by anchors on the vehicle floor 26. For example, the vehicle 10 may include a plurality of latches 32 supported by the vehicle floor 26. The latches 32 may engage wheels of the wheelchair to lock the wheels of the wheelchair relative to the vehicle floor 26. The latches 32 may be anchored to the vehicle floor 26 and may retractably extend through the wheels of the wheelchair. The vehicle 10 may include any suitable number of latches 32 for the number of wheelchairs that may be accommodated by the vehicle 10. The latches 32 may be any suitable type of latches 32. For example, as shown in the Figures, the latches 32 may be of the type that are manually operated by an occupant of the wheelchairs. In other examples, the latches 32 may be of the type that are electronically operated, e.g., solenoid, to latch the wheels of the wheelchair, e.g., through a human-machine interface such as a button, switch, touch-screen, etc.

In the example in which the occupant-seating area 14 is defined by the vehicle seat 28, the occupant-seating area 14 is the area occupied by an occupant properly seated on the vehicle seat 28 in the passenger compartment 20. Specifically, the occupant-seating area 14 is seat-forward of a seatback 36 of the seat and above a seat bottom 34 of the seat.

The vehicle seat 28 may be supported by the vehicle floor 26, as shown in the example in the Figures. The seat includes the seatback 36 and the seat bottom 34. The seatback 36 may be supported by the seat bottom 34 and may be stationary or movable relative to the seat bottom 34. The seatback 36 and the seat bottom 34 may be adjustable in multiple degrees of freedom. Specifically, the seatback 36 and the seat bottom 34 may themselves be adjustable. In other words, adjustable components within the seatback 36 and/or the seat bottom 34, and/or may be adjustable relative to each other. The seats may be of any suitable type, e.g., a bucket seat.

With continued reference to FIGS. 1 and 2, the vehicle 10 includes at least one dash 12. In the example shown in the Figures, the vehicle 10 includes one dash 12 at the front end 22 of the passenger compartment 20. In addition, or in the alternative, the vehicle 10 may include another dash 12 at the rear end 24 of the passenger compartment 20. The dash 12 may also be called a bulkhead. In some examples, the dash 12 may be called an instrument panel.

The dash 12 may be a structural member of the frame of the vehicle 10, i.e., a portion of the frame resists static and dynamic forces from operation of the vehicle 10 without undue deflection or distortion. Examples of forces include a weight of other vehicle components, passengers, and cargo; twisting moments or torsional moments caused by driving over uneven surfaces; torque from a transmission; longitudinal and lateral forces from driving; and possibly forces from impacts with other vehicles or impactors.

The dash 12 may include vehicle controls, such as gauges, dials, screens, and information displays; heating and ventilation equipment; a radio and other electronics; etc. The dash 12, as well as the rest of the vehicle 10, may lack a steering wheel and may lack pedals for accelerating and braking. In other words, as shown in FIGS. 1 and 2, no steering wheel or pedals for accelerating and braking are supported by or adjacent to the dash 12. More specifically, the vehicle 10 does not include a steering wheel or pedals for accelerating and braking, e.g., the vehicle 10 is autonomous.

The dash 12 may extend from one side of the vehicle 10 to the other side of the vehicle 10, i.e., across the passenger compartment 20 in a cross-vehicle direction. For example, the dash 12 may extend from one pillar to another pillar. The dash 12 may extend downwardly from a windshield (not numbered). For example, the dash 12 may extend from the windshield to the vehicle floor 26 of the vehicle 10.

In the example shown in the Figures, the dash 12 is spaced vehicle-forward of the occupant-seating areas 14. The dash 12 faces the occupant-seating areas 14. The dash 12 may, for example, include a class-A surface, i.e., a surface specifically manufactured to have a high quality, finished aesthetic appearance free from blemishes.

The dash 12 may, for example, be flat in the cross-vehicle direction. In other words, the dash 12 may be generally planar. Specifically, a vehicle-rearward face 38 of the dash 12 in the example shown in FIGS. 1 and 2 may be flat.

With reference to FIGS. 1-4, the vehicle includes a console assembly 40. The console assembly 40 includes the console 16, at least one table 18, and at least one airbag assembly 64. The console assembly 40 is between two seats in the deployed position and, in such an example, may be referred to as a middle console assembly 40. The console assembly 40 may be centered cross-vehicle in the passenger compartment 20, as shown in the Figures. In such an example, the console assembly 40 may be referred to as a center console assembly 40.

The console 16 is supported by the vehicle floor 26. In other words, the weight of the console 16 is borne by the vehicle floor 26. The console 16 extends upwardly from the vehicle floor 26 between the first seat and the second seat in the deployed position. The console 16 may include a class-A surface exposed to the passenger cabin, i.e., a finished surface free of unaesthetic blemishes and defects and exposed to view by a vehicle occupant seated in the vehicle 10. The console 16 may include cup holders and may support vehicle controls, e.g., a gear shifter, window controls, HVAC controls, multimedia controls, etc. In addition, or in the alternative, the console 16 includes a base 42 and an armrest 44. The console assembly 40 may include wiring and/or other physical structure connected to electronic components on the console assembly 40 and may extend from the console 16 to the dash 12 in a concealed manner. The console 16 may be, for example, plastic such as acrylonitrile butadiene styrene (ABS), vinyl, etc.

In examples in which the console 16 includes the base 42 and the armrest 44, the armrest 44 is above the base 42 and, for example, may be supported by the base 42. The armrest 44 is designed to support the arm of occupants of the vehicle 10 the occupant-seating areas 14. Specifically, the armrest 44 is sized, shaped, and positioned to support the arm of the occupant. The armrest 44 may be upholstered, e.g., with a covering of vinyl, leather, etc.

The console 16 may include a storage compartment (not numbered) below the armrest 44. In such an example, the armrest 44 is moveably attached to the base 42. The storage compartment may be designed to store items, e.g., personal items belonging to a vehicle occupant. The armrest 44 may be selectively moveable relative to the base 42 to cover and uncover the storage compartment. In such examples, the base 42 is a bin and the armrest 44 is a lid of the storage compartment to allow access to the storage compartment. As an example, the armrest 44 may be rotatable relative to the storage compartment. In such an example, a hinge rotatably connects the armrest 44 to the console 16. Specifically, the armrest 44 may be rotatable upwardly from the storage compartment about the hinge between a closed position and an open position.

With reference to FIGS. 1 and 2, the console 16 includes a vehicle-forward end 46 and a vehicle-rearward end 48. The vehicle-forward end 46 is vehicle-forward of the vehicle-rearward end 48. The vehicle-forward end 46 faces vehicle-forward and the vehicle-rearward end 48 faces vehicle-forward. The console 16 may include two lateral sides 50 spaced from each other and each extending from the vehicle-forward end 46 to the vehicle-rearward end 48. The console 16 terminates at the vehicle-forward end 46, the vehicle-rearward end 48, and the two lateral sides 50. As an example, the console 16 may be rectangular in a horizontal cross-section. The console 16 may be elongated from the vehicle-forward end 46 to the vehicle-rearward end 48. Specifically, the console 16 may be elongated along the vehicle-longitudinal axis L. The console 16 has an uppermost side 52 that faces upwardly. The console 16 terminates at the uppermost side 52. The uppermost side 52 may be, for example, on the armrest 44.

As set forth above, the console assembly 40 includes the table 18 on the console 16. The console 16 is moveable relative to the dash 12 along the vehicle-longitudinal axis L between the stowed position and the deployed position and the table 18 is moveable relative to the console 16 along the vehicle-longitudinal axis. Specifically, in the example shown in the Figures, the console assembly 40 includes two tables 18 on the console 16. The tables 18 are independently moveable relative to the console 16 along the longitudinal axis, i.e., one table 18 can move along the longitudinal axis L relative to the console 16 and the other table 18.

In the example shown in the Figures, the table 18 is on the lateral sides 50 of the console 16. Specifically, the table 18 is supported by the lateral sides 50 of the console 16. In other words, the weight of the table 18 is borne by the lateral side 50 of the console 16. In the example shown in the Figures, the table 18 is supported by one of the lateral sides 50 of the console 16.

The table 18 is moveable with the console 16 between the stowed position and the deployed position. Specifically, the table 18 is moveable relative to the console 16 along the vehicle-longitudinal axis. The table 18 is movable along the lateral sides 50 of the console 16. When the console 16 is in the stowed position the table 18 may be concealed in the dash 12, and when the console 16 is in the deployed position the table 18 is exposed to the passenger compartment 20.

The console assembly 40 includes a drive mechanism 54 to move the table 18 relative to the console 16. The console assembly 40 may include one drive mechanism 54 that independently moves both tables 18 along the longitudinal axis L relative to the console 16 or may include separate drive mechanisms 54 each dedicated to one of the tables 18, respectively. As an example, with reference to FIG. 3, the console assembly 40 may include a motor 56 and a lead screw 58. In such an example, the motor 56 is engaged with the lead screw 58 to rotate the lead screw 58. The motor 56 rotates the lead screw 58 to move the table 18 relative to the console 16. Specifically, the motor 56 is fixed to the console 16 or table 18 and a carriage 60 is fixed to the other of the console 16 or table 18. The carriage 60 is threadedly engaged with the threads of the lead screw 58 such that rotation of the lead screw 58 by the motor 56 linearly moves the carriage 60 and the table 18 relative to the console 16. The lateral side 50 of the console 16 includes a slot 62 elongated along the vehicle-longitudinal axis. In the example shown in FIG. 3, the table 18 is adjacent to the slot 62. Specifically, the table 18 is movable relative to the slot 62 along the vehicle-longitudinal axis. The slot 62 may be elongated between the vehicle-forward end 46 and the vehicle-rearward end 48 of the console 16.

The table 18 extends over the occupant-seating area 14 when the console 16 is in the deployed position. Specifically, the table 18 extends over legs of the occupant occupying the occupant-seating area 14. The table 18 may be vehicle-forward of the torso of the occupant occupying the occupant-seating area 14. The table 18 may be elongated away from the console 16 over the occupant-seating area 14 when the console 16 is in the deployed position. When the console 16 is in the deployed position, the table 18 may be adjusted vehicle-forward and vehicle-rearward along the longitudinal axis L so that the table 18 is above the legs of the occupant and vehicle-forward of the torso of the occupant.

As set forth above, the console assembly 40 includes the airbag assembly 64 on the table 18. Specifically, the console assembly 40 includes at least one airbag assembly 64 and, in the example shown in the Figures, the console assembly 40 includes two airbag assemblies 64, i.e., one airbag assembly 64 on each table 18. The airbag assembly 64 includes an airbag 66 and an inflator 68. In examples including two airbag assemblies 64, the airbag assemblies 64 may each have an inflator 68 or may share a common inflator 68.

At least a portion of the airbag assembly 64 is supported by the table 18. In other words, the weight of a portion of the airbag assembly 64 is borne by the table 18. As an example, the airbag 66 is supported by the table 18 in both an uninflated position and an inflated position. The inflator 68 may be supported by the table 18, as described further below.

The airbag 66 is in the uninflated position when the console 16 is in the stowed position and/or when the console 16 is in the deployed position. In the uninflated position, the airbag 66 may be rolled and/or folded on the table 18. The airbag 66 is inflatable to the inflated position when the console 16 is in the deployed position. The airbag 66 is inflatable upwardly between the dash 12 and the respective occupant-seating area 14 from the uninflated position to the inflated position. In the event of certain vehicle impact, e.g., certain frontal impacts, the airbag 66 is inflated to the inflated position to control the kinematics of the occupant of the occupant-seating area 14.

As set forth above, the airbag 66 is supported by the table 18. Specifically, the table 18 includes a top 70 and a peripheral edge 72 around the top 70. The airbag 66 may be mounted to the table 18 at the peripheral edge 72 in the uninflated position and the inflated position. The console 16 may include a covering 74 that conceals the airbag 66 in the uninflated position. The covering 74 may be cloth, leather, faux leather, or any other suitable material. The covering 74 may have a class-A surface, i.e., a finished surface exposed to view by a customer and free of unaesthetic blemishes and defects. The covering 74 may include one or more tear seams through which the airbag assembly 64 is deployable from the uninflated position to the inflated position. Specifically, the airbag 66 may be disposed between the table 18 and the covering 74, e.g., mounted to the peripheral edge 72 of the table 18 beneath the covering 74.

The airbag 66 is inflatable from the peripheral edge 72 to an inflated position. In the inflated position inflates vehicle-outboard and upwardly from the table 18 between the dash 12 and the occupant-seating area 14. In the example shown in the Figure, the airbag 66 abuts the console 16 in the inflated position. Specifically, the airbag 66 may use the console 16 as a reaction surface to control the kinematics of the occupants.

The airbag 66 is between the dash 12 and the occupant-seating area 14. The airbag 66 may be horizontally aligned with the seat bottom 34. In other words, at least a portion of the airbag 66 is in a common horizontal plane with the seat bottom 34. Specifically, a lower portion of the airbag 66 is between the seat bottom 34 and the dash 12 in a horizontal plane.

The airbag 66 may be fabric, e.g., a woven polymer yarn. The woven polymer yarn may be, for example, nylon 66. Other examples of the woven polymer yarn include polyether ether ketone (PEEK), polyetherketoneketone (PEKK), polyester, etc. The woven polymer yarn may include a coating, such as silicone, neoprene, urethane, etc. For example, the coating may be polyorgano siloxane.

Figure 5:
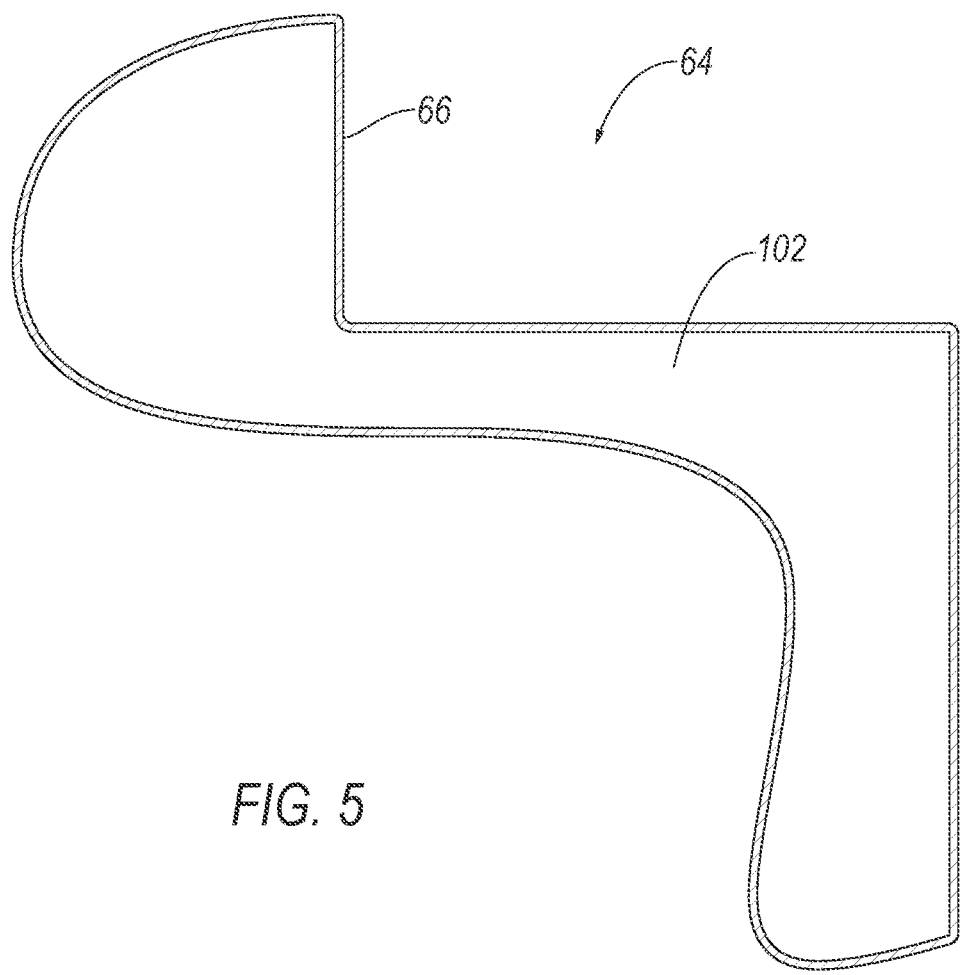
FIG. 5 is a cross-sectional view of the airbag.

With reference to FIG. 5 the airbag 66 includes an inflation chamber 102. The airbag assembly 64 includes at least one inflator 68. In examples including two airbags 66 as shown in the Figures, one inflator 68 may inflate both airbags 66, e.g., through separate fill tubes. As another example, the airbag assembly 64 may include one inflator 68 in fluid communication with one airbag 66 18 and another inflator 68 in fluid communication with the other airbag 66.

The inflator 68 may be supported by the console 16. The inflator 68 may be directly or indirectly supported by the console 16. As an example, the inflator 68 may be directly mounted to the table 18, in which case the inflator 68 is indirectly supported by the console 16 through the table 18. As another example, the inflator 68 may be directly mounted to the console 16. The inflator 68 may be directly mounted to the table 18 or the console 16 with, for example, fasteners such as threaded fasteners, push-pins, Christmas-tree fasteners, etc.

The inflator 68 is fluidly connected to the airbag 66. Specifically, the inflator 68 expands the airbag 66 with inflation medium, such as a gas, to move the airbag 66 from the uninflated position to the inflated position. The inflator 68 may be, for example, a pyrotechnic inflator 68 that ignites a chemical reaction to generate the inflation medium, a stored gas inflator 68 that releases (e.g., by a pyrotechnic valve) stored gas as the inflation medium, or a hybrid. The airbag assembly 64 may include any suitable number of inflators 68.

The console 16 is moveably engaged with the vehicle floor 26. Specifically, the console 16 is moveable relative to the vehicle floor 26 from the stowed position to the deployed position. Specifically, the console 16 may be in a stowed position to allow ingress and egress of occupants of the vehicle 10 and the console 16 may be deployed when the vehicle 10 is in motion. The console 16 moves along a vehicle-longitudinal axis L between the stowed position and the deployed position. Specifically, the console 16 moves vehicle-rearward along the vehicle-longitudinal axis L when the console 16 moves from the stowed position to the deployed position and vehicle-forward along the vehicle-longitudinal axis L when the console 16 moves from the deployed position to the stowed position.

The console assembly 40 and/or the vehicle floor 26 may include a drive mechanism 82 to move the console 16 relative to the dash 12 between the stowed position and the deployed position. For example, with reference to FIGS. 1-4, the vehicle 10 may include one or more tracks 76 between the console assembly 40 and the vehicle floor 26. In the example shown in the Figures, the vehicle 10 includes two tracks 76 spaced cross-vehicle from each other. The track 76 may be a component of the console 16 and/or a component of the vehicle floor 26. In any event, the track 76 is between the console 16 and the vehicle floor 26. The track 76 guides movement of the console 16 relative to the vehicle floor 26 between the deployed and stowed positions. The track 76 guides may restrict movement of the console 16 relative to the vehicle floor 26 to linear movement, i.e., linear movement parallel to the vehicle-longitudinal axis L.

With reference to FIG. 1, the assembly may include one or more track actuators 78 between the track 76 and the console 16. The track actuator 78 moves the console 16 relative to the track 76. The track 76 is drivably coupled to the console 16 to move the console 16 along the track 76 between the stowed position to the deployed position.

Figure 3:
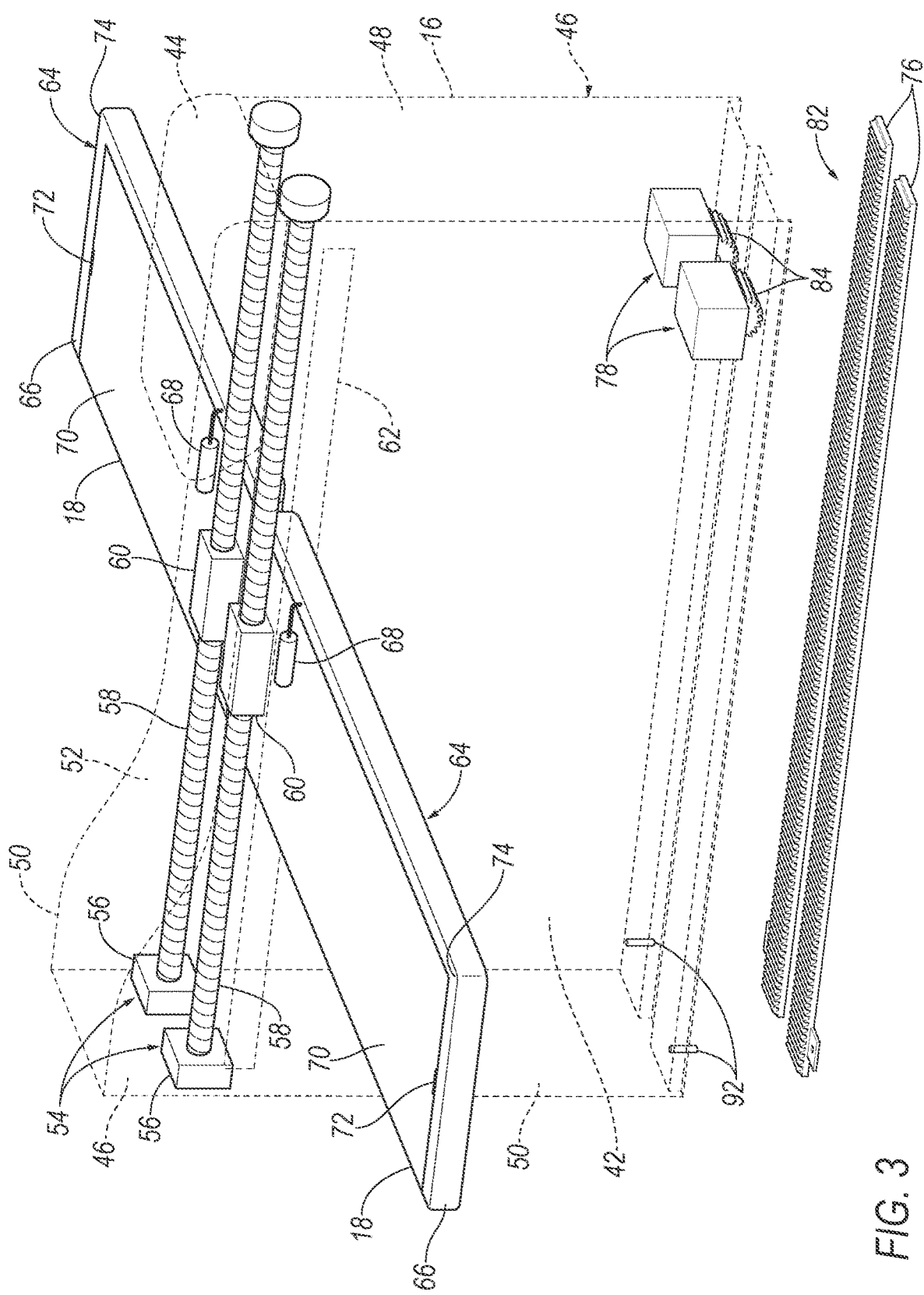
FIG. 3 is an exploded view of the console assembly from tracks on a vehicle floor of the vehicle.
Figure 4:
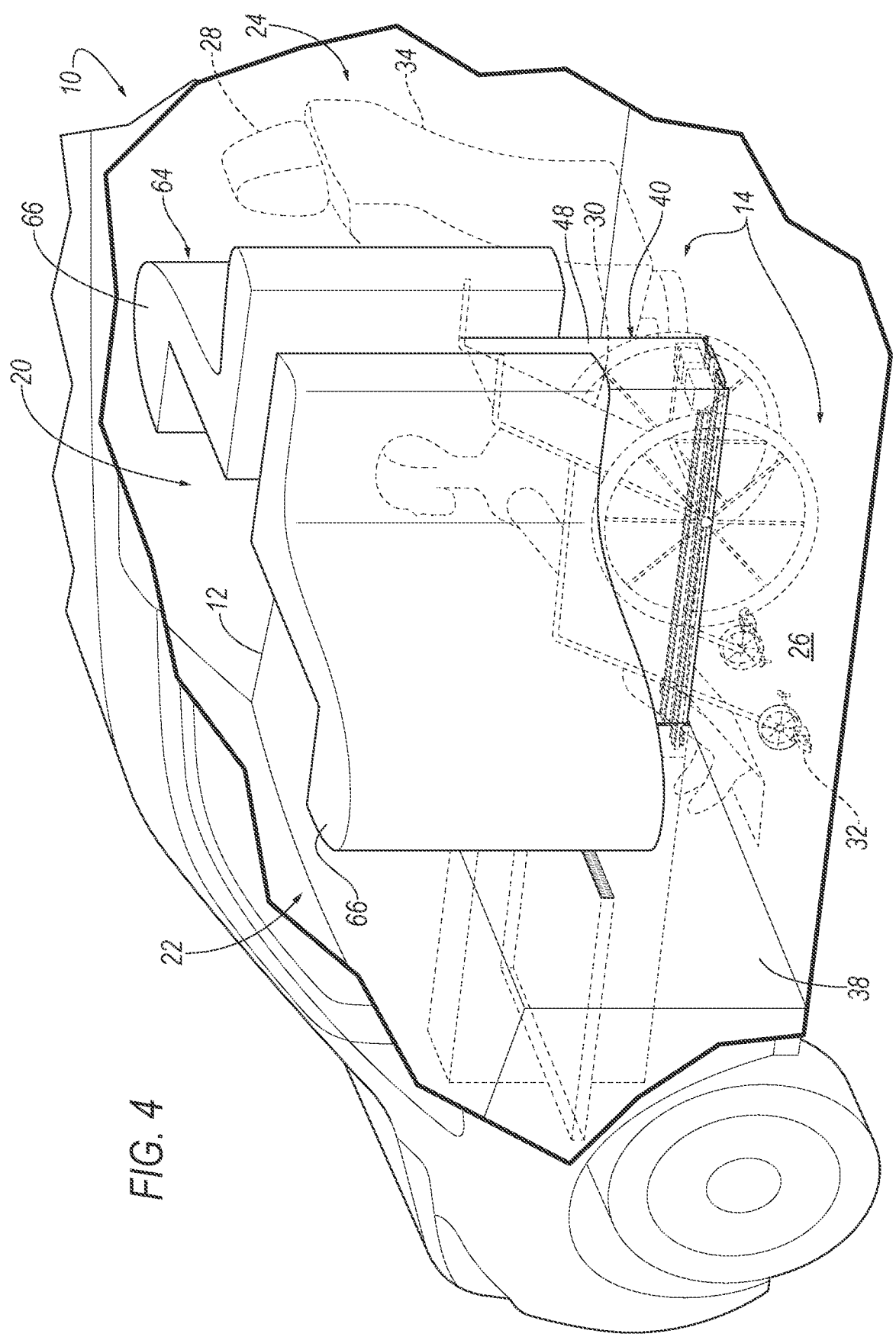
FIG. 4 is a perspective view of the console assembly in the deployed position with airbags on the console assembly in the inflated position.

With reference to FIG. 3, the track 76 may be toothed (i.e., is a rack) and the track actuator 78 may include a pinion 84 rotatably engaged with the track 76. In such an example, a motor 80, e.g., an electric motor, rotates the pinion 84 to linearly move along the track 76 to slide the console 16 along the track 76. The motor 80 may be activated to move the console 16 relative to the vehicle floor 26 from the stowed position to the deployed position and from the deployed position to the stowed position based on occupancy of the seats, e.g., based on detection of an occupant by an occupancy sensor 86, as described further below.

As another example, in the alternative to the track actuator 78 shown in FIG. 3, the track actuator 78 may include a motor and a lead screw. In such an example, the motor of the track actuator 78 is engaged with the lead screw of the track actuator 78 to rotate the lead screw of the track actuator 78. The motor of the track actuator 78 rotates the lead screw of the track actuator 78 to move the console 16 between the stowed position and the deployed position. Specifically, the motor of the track actuator 78 is fixed to one of the console 16 or the vehicle floor 26 and a carriage of the track actuator 78 fixed to the other of the console 16 or the vehicle floor 26. The carriage of the track actuator 78 is threadedly engaged with the threads of the lead screw such that rotation of the lead screw by the motor linearly moves the carriage of the track actuator 78 and the console 16 relative to the vehicle floor 26.

In the example shown in the Figures, the console 16 is disposed in the dash 12 in the stowed position (FIG. 1) and is movable away from the dash 12 along the occupant-seating area 14 from the stowed position to the deployed position (FIG. 2) extending from the dash 12. Specifically, the console 16 includes a tunnel 90 and the console 16 is moveable out of the tunnel 90 to the deployed position and is moveable into the tunnel 90 to the stowed position.

As shown in FIG. 1, in the stowed position, the console 16 is retracted in the dash 12. Specifically, the tunnel 90 receives the console 16 in the stowed position. For example, in the example shown in the Figures, the console 16 may be retracted in the tunnel 90. The stowed position of the console 16 allows for space within the passenger compartment 20 for occupants to move without obstruction of the console 16.

In the stowed position, components of the console assembly 40 may be disposed in the dash 12, e.g., in the tunnel 90. For example, the tables 18, the armrest 44, cup holders, vehicle controls (e.g., a gear shifter, window controls, HVAC controls, multimedia controls, etc.), etc. may be in the dash 12, e.g., in the tunnel 90, in the stowed position.

In some examples, the console 16 may be flush with the dash 12 in the stowed position, as shown in the example shown in FIG. 1. Specifically, the vehicle-forward end 46 is flush with vehicle-rearward face 38 of the dash 12 at the tunnel 90 in the stowed position and spaced from the vehicle-rearward face 38 of the dash 12 in the deployed position. In other words, the vehicle-forward end 46 may be aligned with the vehicle-rearward face 38 of the dash 12 along the vehicle-longitudinal axis L. Specifically, the boundary of the console 16 adjacent the tunnel 90 is co-planar with the vehicle-rearward face 38 of the dash 12 at the tunnel 90 in the stowed position and the contours of the console 16 adjacent the tunnel 90 matches the contours of the vehicle-rearward face 38 of the dash 12 at the tunnel 90 in the stowed position, as shown in the example on FIG. 1.

In the deployed position, the console 16 is extended from the dash 12. The console 16 moves vehicle-rearward from the dash 12 from the stowed position to the deployed position. Specifically, the vehicle-forward end 46 of the console 16 is spaced from the vehicle-rearward face 38 of the dash 12 vehicle-rearward of the dash 12 in the deployed position. As an example, the console 16 may move parallel to the vehicle-longitudinal axis L from the stowed position to the deployed position and from the deployed position to the stowed position. The vehicle-forward end 46 of the console 16 is engaged with the track 76 in the deployed position. Specifically, the vehicle-rearward end 48 of the console 16 is engaged with the track 76 as the console 16 moves between the stowed position and the deployed position.

In the deployed position, components of the console 16 may be spaced from the dash 12, e.g., outside the tunnel 90. For example, the armrest 44, cup holders, vehicle controls (e.g., a gear shifter, window controls, HVAC controls, multimedia controls, etc.), etc. may be spaced from the dash 12, e.g., outside the tunnel 90, in the deployed position.

The vehicle-forward end 46 engaged with the dash 12 in the deployed position. Specifically, the vehicle-forward end 46 of the console 16 may be engaged with the tunnel 90 of the dash 12 in the deployed position. In other words, the vehicle-forward end 46 of the console 16 may be retained in the tunnel 90 of the dash 12 in the deployed position.

Figure 6A:
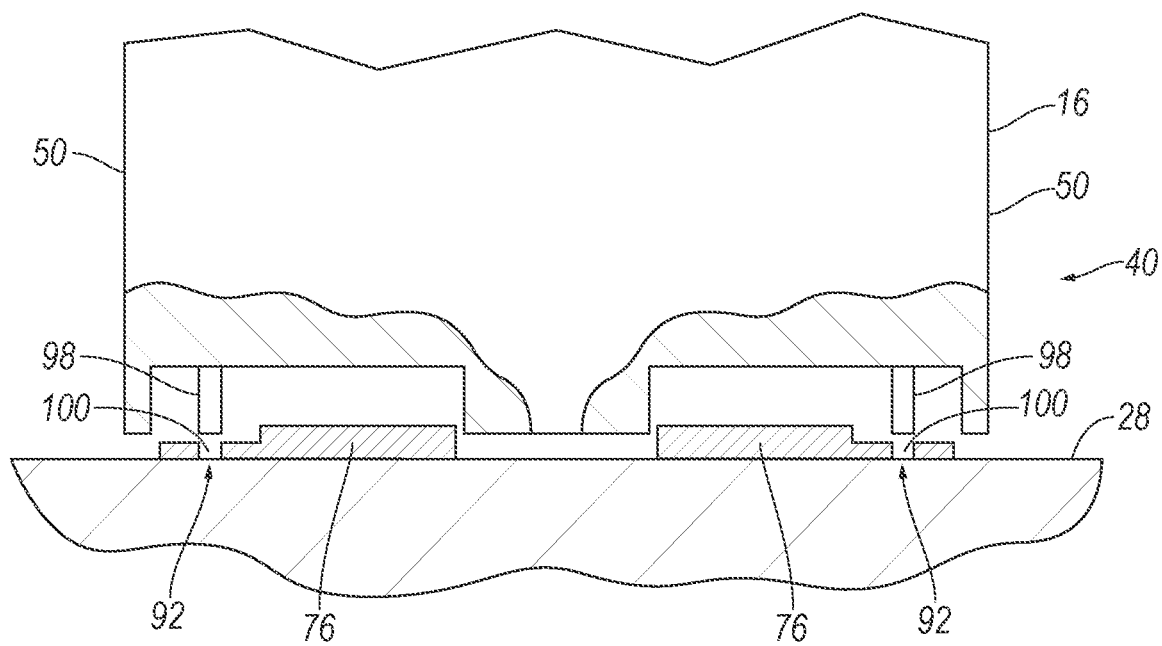
FIG. 6A is a cross-sectional view of a portion of the console assembly.
Figure 6B:
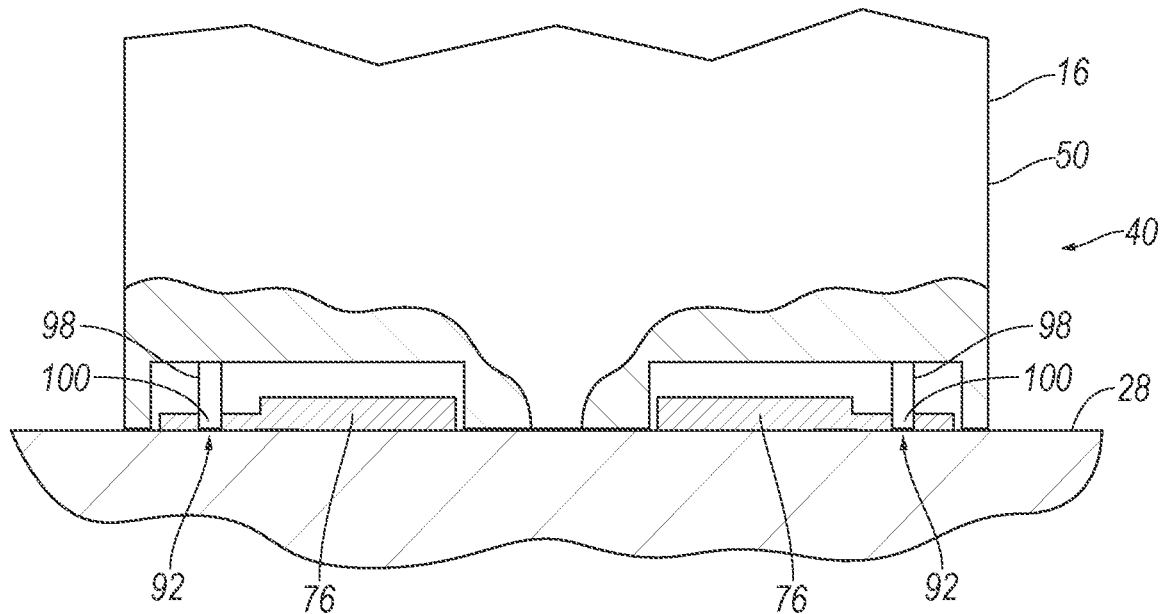
FIG. 6B is the cross-sectional view of FIG. 6A with pegs on the console engaged with holes in the vehicle floor.

With reference to FIGS. 6A and 6B, the console assembly 40 may include a lock 92 to lock 92 the console 16 relative to the vehicle floor 26 and the dash 12 in the deployed position in the event of a vehicle impact. The lock 92 restricts movement of the console 16 vehicle-forward along the tracks 76 in the event an occupant loads the airbag 66 in certain impacts and/or the console 16 during a vehicle impact. The lock 92 may be mechanically activated under forces associated with vehicle impact, as described below. In other examples, the lock 92 may be electronically activated, e.g., locked and unlocked as commanded by a computer 94 of the vehicle 10.

Specifically, during certain vehicle impact in which an occupant of the occupant-seating area 14 loads the airbag 66, the occupant may urge the console 16 vehicle-forward. In such an event the console 16 may tilt, i.e., the vehicle-forward end 46 of the console 16 may tilt downwardly toward the vehicle floor 26 and/or the vehicle-forward end 46 of the console 16 may tilt upwardly away from the vehicle floor 26. The lock 92 may include a peg 100 on one the console 16 or the vehicle floor 26/track 76 and a hole 98 on the other of the console 16 or the vehicle floor 26/track 76. In the example shown in the Figures, the peg 100 is on the console 16 and the hole 98 is on the track 76 (and in other examples the hole 98 may be on the vehicle floor 26). The peg 100 and the hole 98 are positioned so that the peg 100 and the hole 98 are vertically aligned when the console 16 is in the extended position. FIG. 6A shows the console 16 in the deployed position and the position of the console 16 relative to the vehicle floor 26 in the absence of tilting, and FIG. 6B shows the console 16 in the deployed position and the position of the console 16 relative to the vehicle floor 26 when the console 16 tilts when the airbag 66 is loaded by an occupant during certain impacts. With reference to FIG. 6A, the peg 100 is disengaged with the hole 98 in the absence of tilting of the console 16. Accordingly, the console 16 is free to move from the deployed position to the stowed position, i.e., under the power of the motor 80, without interference between the peg 100 and the hole 98. With reference to FIG. 6B, the tilting of the console 16 engages the peg 100 in the hole 98 to resist vehicle-forward movement of the console 16.

Figure 7:
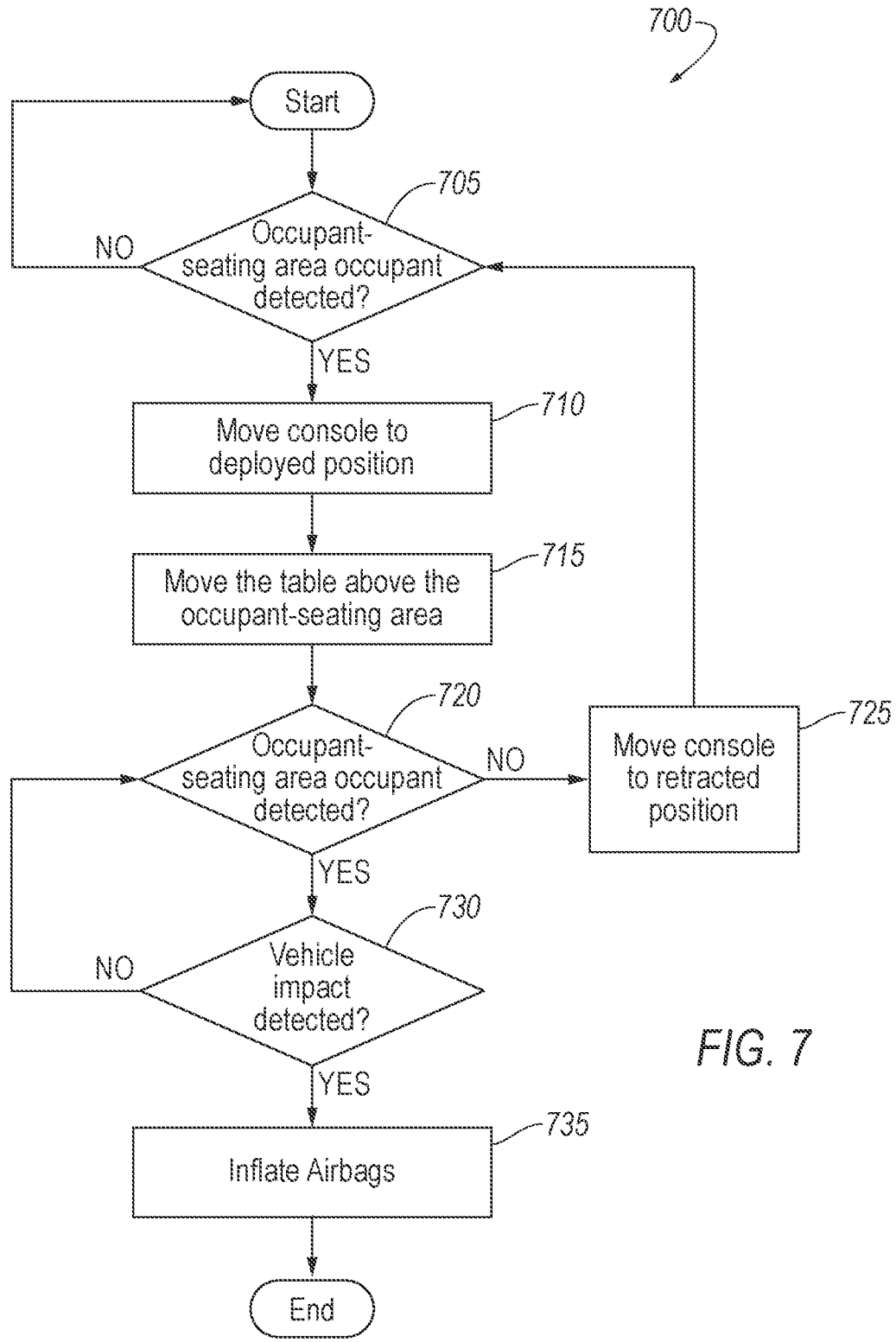
FIG. 7 is a flow chart showing an example method the vehicle.
Figure 8:
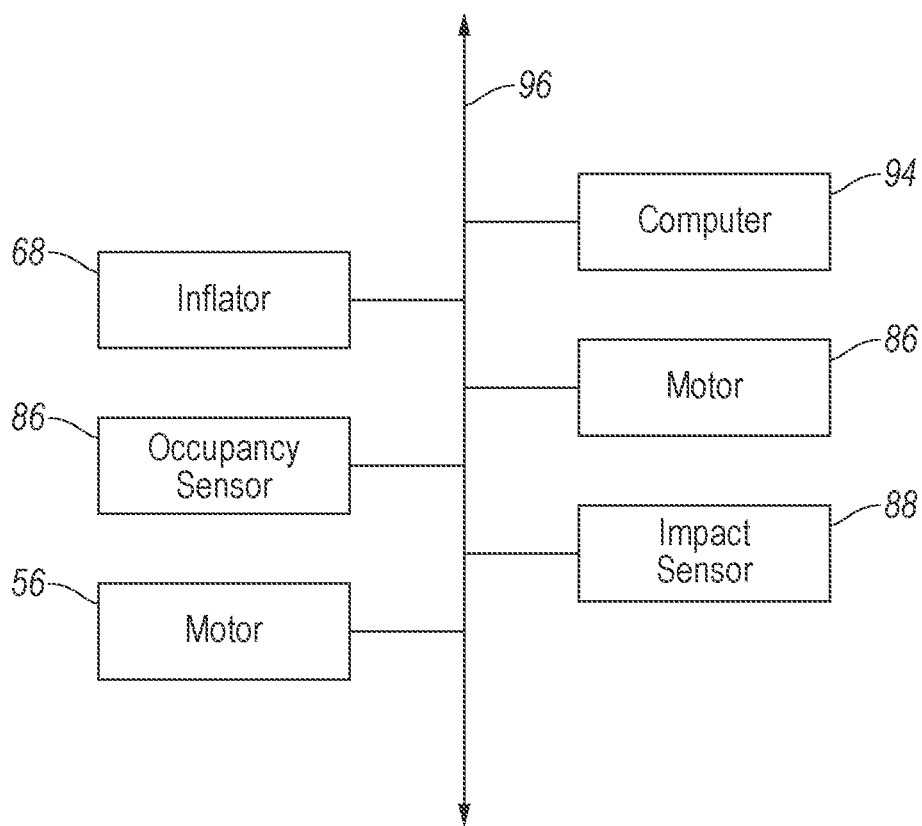
FIG. 8 is a block diagram of a system of the vehicle.

With reference to FIG. 8, the vehicle 10 includes a computer 94 including a processor and a memory. The computer 94 may be a restraints control module. The memory includes one or more forms of computer 94 readable media, and stores instructions executable by the computer 94 for performing various operations, including as disclosed herein and including, for example, method 700 shown in FIG. 7 and described below. For example, the computer 94 may be a generic computer 94 with a processor and memory as described above and/or may include an electronic control unit ECU or controller for a specific function or set of functions, and/or a dedicated electronic circuit including an ASIC (application specific integrated circuit) that is manufactured for a particular operation, e.g., an ASIC for processing sensor data and/or communicating the sensor data. In another example, a computer 94 may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in a computer 94. The memory may be of any type, e.g., hard disk drives, solid state drives, servers, or any volatile or non-volatile media. The memory may store the collected data sent from the sensors. The memory may be a separate device from the computer 94, and the computer 94 may retrieve information stored by the memory via a network in the vehicle 10, e.g., over a CAN bus, a wireless network, etc. Alternatively or additionally, the memory may be part of the computer 94, e.g., as a memory of the computer 94.

As shown in FIG. 8, the computer 94 is generally arranged for communications on a vehicle communication network 96 that may include a bus in the vehicle 10 such as a controller area network CAN or the like, and/or other wired and/or wireless mechanisms. Alternatively or additionally, in cases where the computer 94 includes a plurality of devices, the vehicle communication network 96 may be used for communications between devices represented as the computer 94 in this disclosure. Further, as mentioned below, various controllers and/or sensors may provide data to the computer 94 via the vehicle communication network 96.

The vehicle 10 may include at least one impact sensor 88 for sensing impact of the vehicle 10. The computer 94 is in communication with the impact sensor 88 and the inflator 68. The computer 94 may activate the inflators 68, e.g., provide an impulse to a pyrotechnic charge of the inflator 68 when the impact sensor 88 senses an impact of the vehicle 10. Alternatively or additionally to sensing impact, the impact sensor 88 may be configured to sense impact prior to impact, i.e., pre-impact sensing. The impact sensor 88 may be in communication with the computer 94. The impact sensor 88 is configured to detect an impact to the vehicle 10. The impact sensor 88 may be of any suitable type, for example, post contact sensors such as accelerometers, pressure sensors, and contact switches; and pre-impact sensors 88 such as radar, LIDAR, and vision sensing systems. The vision sensing systems may include one or more cameras, CCD image sensors, CMOS image sensors, etc. The impact sensor 88 may be located at numerous points in or on the vehicle 10.

The vehicle 10 may include at least one occupancy sensor 86. The occupancy sensor 86 configured to detect occupancy of the occupant-seating area 14. The occupancy sensor 86 may be visible-light or infrared cameras directed at the occupant-seating area 14, weight sensors supported by the seat bottom 34 and/or vehicle floor 26, sensors detecting whether a seatbelt assembly for the seat is buckled, or other suitable sensors. The occupancy sensor 86 provides data to the computer 94 specifying whether the seat is occupied or unoccupied.

With reference to FIG. 7, the vehicle computer 94 stores instructions to control components of the vehicle 10 according to the method 700 shown in FIG. 7. Specifically, the method 700 includes moving the console 16 between the stowed position and the deployed position based on occupancy of the occupant-seating area 14 and inflating the airbag 66 when the console 16 is in the deployed position and certain vehicle impact, e.g., certain frontal impact, is detected. Use of "in response to," "based on," and "upon determining" herein, including with reference to method 700, indicates a causal relationship, not merely a temporal relationship.

With reference to FIG. 7, the method 700 is initiated with initial detection of an occupant in one of the occupant-seating areas 14, as shown in block 705. When an occupant is detected in at least one of the occupant-seating areas 14, the method 700 includes moving the console 16 from the stowed position to the deployed position, as shown in block 710. Specifically, block 710 may include providing a command to the motor 80 to move the console 16 relative to the track 76 from the stowed position to the deployed position.

When an occupant is detected in at least one of the occupant-seating areas 14, the method 700 includes moving the table 18 relative to the console 16 along the longitudinal axis. Specifically, the method 700 includes moving the table 18 to be above the occupant-seating area 14, and more specifically above the legs of the occupant in the occupant-seating area 14 and vehicle-forward of the torso of the occupant in the occupant-seating area 14. Specifically, block 715 may include providing a command to the motor 80 to move the table 18 relative to the track 76. The method may include positioning the table 18 relative to the track 76 and/or the occupant-seating area 14 based on information detected by the occupancy sensor 86. For example, the occupancy sensor 86 may detect the position of the occupant and may move the table 18 relative to the console 16 to be above the legs of the occupant of the occupant-seating area 14 and vehicle-forward of the torso of the occupant of the occupant-seating area 14.

While the console 16 is in the deployed position, the method 700 continues to monitor occupancy of the occupant-seating area 14, as shown in block 720, e.g., based on detections by the occupancy sensor 86. At block 720, if vacancy of both occupant-seating areas 14 is detected (e.g., as a detection of no occupant in the occupant-seating area 14 or lack of detection of an occupant on either occupant-seating area 14), the method 700 includes moving the console 16 to the stowed position, as shown in block 725. Specifically, block 725 may include providing a command to the motor 80 to move the console 16 relative to the track 76 from the deployed position to the stowed position.

At block 720, if occupancy of the occupant-seating area 14 is continued to be detected, the method 700 includes monitoring for vehicle impact. If no vehicle impact is detected, the method 700 continues to monitor for seat occupancy in block 720 and vehicle impact in block 730. If vehicle impact is detected in block 730, the method 700 includes inflating the airbags 66 while the console 16 is in the deployed position, as shown in block 735.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle comprising:
   a dash;
   an occupant-seating area;
   a console being moveable relative to the dash between a stowed position and a deployed position, the console being disposed in the dash in the stowed position and being movable away from the dash along the occupant-seating area from the stowed position to the deployed position; and
   a table supported by the console, the table extending over the occupant-seating area when the console is in the deployed position.

2. The vehicle of claim 1, further comprising an airbag supported by the table.

3. The vehicle of claim 2, wherein the table includes a top and a peripheral edge around the top, the airbag mounted to the table at the peripheral edge and inflatable from the peripheral edge to an inflated position.

4. The vehicle of claim 2, further comprising an inflator supported by the console and fluidly connected to the airbag.

5. The vehicle of claim 2, further comprising a cover supported by the table, the airbag being disposed between the table and the cover.

6. The vehicle of claim 1, wherein the table is moveable with the console.

7. The vehicle of claim 6, wherein the console is moveable relative to the dash along a vehicle-longitudinal axis between the stowed position and the deployed position and the table is moveable relative to the console along the vehicle-longitudinal axis.

8. The vehicle of claim 1, wherein the console is moveable relative to the dash along a vehicle-longitudinal axis between the stowed position and the deployed position.

9. The vehicle of claim 1, wherein the occupant-seating area is configured to receive a personal mobility device.

10. The vehicle of claim 1, further comprising a vehicle seat having the occupant-seating area.

11. The vehicle of claim 1, wherein the console includes a vehicle-forward end engaged with the dash in the deployed position.

12. The vehicle of claim 1, further comprising a vehicle floor and a track between the console and the vehicle floor, the console being moveable along the track from the stowed position to the deployed position.

13. The vehicle of claim 1, wherein the dash includes a tunnel that receives the console in the stowed position.

14. The vehicle of claim 13, wherein the console includes a vehicle-forward end engaged with the tunnel of the dash in the deployed position.

15. The vehicle of claim 13, wherein the console includes a vehicle-rearward end, the vehicle-rearward end being flush with the dash at the tunnel in the stowed position and spaced from the dash in the deployed position.

16. The vehicle of claim 1, wherein the console includes a vehicle-rearward end, the vehicle-rearward end being flush with the dash in the stowed position and spaced from the dash in the deployed position.

17. The vehicle of claim 16, further comprising a vehicle floor and a track between the console and the vehicle floor, the console being moveable along the track from the stowed position to the deployed position, the vehicle-rearward end being engaged with the track in the deployed position.

18. The vehicle of claim 1, further comprising:
   a second occupant-seating area, the console being between the occupant-seating area and the second occupant-seating area in the stowed position; and
   a second table supported by the console, the second table extending over the second occupant-seating area when the console is in the deployed position.

19. The vehicle of claim 18, further comprising a second airbag supported by the second table.

* * * * *